United States Patent [19]

Shen

[11] Patent Number: 5,727,286
[45] Date of Patent: Mar. 17, 1998

[54] DOOR CLOSER WITH A PNEUMATIC DASHPOT

[76] Inventor: Chung-Shan Shen, Suite 2, 7F, No. 95-8 Chang Ping Road, Sec. 1, Taichung, Taiwan

[21] Appl. No.: 613,638

[22] Filed: Mar. 11, 1996

[51] Int. Cl.⁶ .................................................. E05F 3/00
[52] U.S. Cl. ........................................ 16/49; 16/82; 16/85
[58] Field of Search ............................... 16/49, 66, 58, 16/82, 85, 86 R, 86 A; 482/112, 121; 251/64

[56] References Cited

U.S. PATENT DOCUMENTS

| | | | |
|---|---|---|---|
| 484,838 | 10/1892 | Wolf | 16/49 |
| 1,425,271 | 8/1922 | Mukden | 16/49 |
| 2,953,811 | 9/1960 | Hall | 16/66 |
| 3,392,419 | 7/1968 | Stein et al. | 16/49 |
| 3,555,591 | 1/1971 | Sogoian | 16/49 |
| 4,230,309 | 10/1980 | Schnitzius | 16/66 |
| 4,486,917 | 12/1984 | Johnston et al. | 16/86 R |
| 4,545,322 | 10/1985 | Yang | 16/85 |
| 4,776,440 | 10/1988 | Yamada et al. | 16/66 |
| 5,517,719 | 5/1996 | Christ | 16/49 |

Primary Examiner—Jeanne M. Clark

[57] ABSTRACT

A structure of a rehabilitating device for automatically closing a movable object comprises a tubular body having a first and a second chamber therein, a cylinder member having a cock mechanism at the inward end axially disposed into the tubular body, a sleeve member incorporated with a pair of steel balls in opposite peripheries sleeved onto the cylinder member and biased at two end by a pair of recoil springs and an air valve fastened to the open end of the tubular body abutting the first chamber. When the cylinder member is extracted outward, the spring is contracted and the air pressure is induced into the first chamber for a slow rehabilitation of the cylinder member. A further extracting the cylinder member leads the sleeve member entered into the second chamber to perform a random positioning of the cylinder member therein.

2 Claims, 3 Drawing Sheets

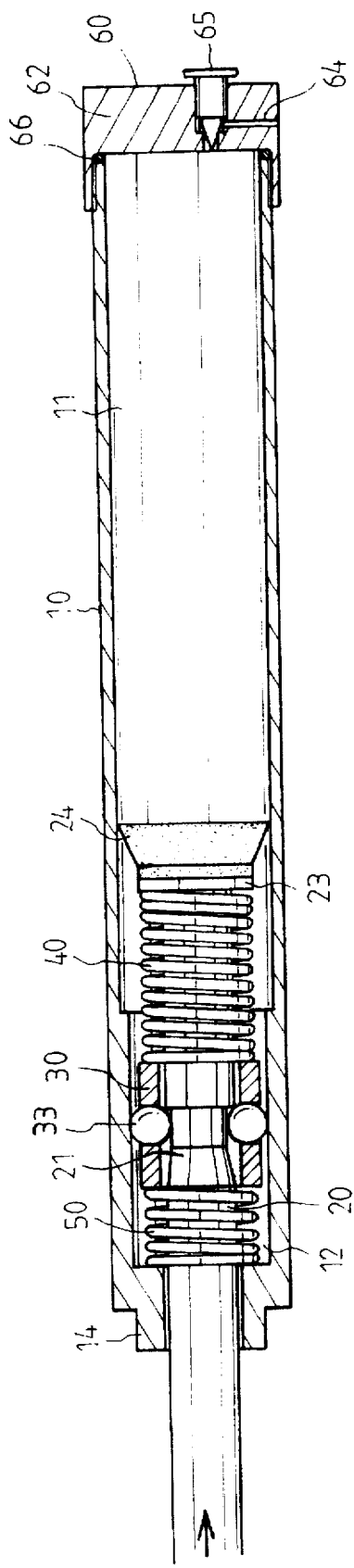
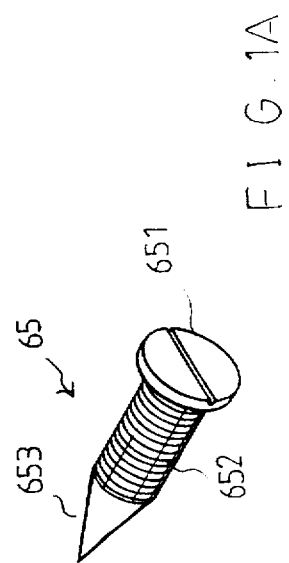
FIG. 4
FIG. 1A

DOOR CLOSER WITH A PNEUMATIC DASHPOT

BACKGROUND OF THE INVENTION

The present invention relates to the automatic closing devices and more particularly to a self-rehabilitating device which has an improved structure providing a maximum flexibility for the random positioning of an opening object and a slow down rehabilitating movement exerted along the closing thereof, and which is simplified in order to facilitate a convenient and economical manufacturing.

Self-rehabilitating device is popularly adapted nowadays to the operation of the automatic doors or the movable mechanisms as for their automatic closing or rehabilitating. This device becomes more important to the industrial automation because of that, upon a numerous improvement on its structure and function, it becomes more precise and more reliable. Currently, typical self-rehabilitating device available in the market has at least the following disadvantages:

a) most of those self-rehabilitating devices have no positioning function provided therein to facilitate the users to contemporarily locate their doors or movable object at an opening position. Some of those devices have positioning functions provided therein but the span from the closed position to the opened position is fixed so as not to provide any flexibility for the users to randomly locate their opened objects.

b) most of those self-rehabilitating devices are actuated by hydraulic force, few of them are actuated by compression springs. However, they have complicated structures so that they are considerably expensive and inconvenient to manufacture.

SUMMARY OF THE PRESENT INVENTION

The present invention has a main object to provide a structure of a self-rehabilitating device which utilizes a sleeve member incorporated with the ball means sliding inside a tubular body for random locating an opening object at infinite positions.

Another object of the present invention is to provide a structure of a self-rehabilitating device which provides maximum span to an opening object.

Still another object of the present invention is to provide a structure of a self-rehabilitating device which utilizes the air pressure to slow down an automatic closing object.

Further object of the present invention is to provide a structure of a self-rehabilitating device which is simplified as to facilitate a convenient and economical manufacturing.

These and other objects and advantages are achieved through the use of a tubular body including a large diameter chamber and a small diameter chamber to define a shoulder thereinbetween, a cylinder member slidably disposed into the chambers of the tubular body and biased by a pair of first and second recoil springs, a sleeve member which incorporates with a pair of steel balls in it's radial recesses wrapped on the cylinder member between the springs and stopped against the shoulder, and an air valve secured to one end of the tubular body abutting the large diameter chamber. The cylinder member further has a cock means at an inner end directing the air valve and an annular groove in the proximity of that end, thereby, extracting the cylinder member outward to contract a recoil spring reserving energy for recoiling the cylinder member back to normal position. But the returning movement of the cylinder member is slow down by the air pressure accumulated in the large diameter chamber. A further extracting of the cylinder member will force the sleeve member across the shoulder and entered into the small diameter chamber so as to facilitate the steel balls stopping randomly against the inner wall of the small diameter chamber.

The present invention will become more fully understood by reference to the following detailed description thereof when read in conjunction with the attached drawings.

BRIEF DESCRIPTION OF THE DRAWINGS

FIG. 1A is a perspective view to show an air control thrustor of the air valve in accordance with the present invention.

FIG. 4 is a sectional view to show a sleeve member entered into a small diameter chamber upon further extracting of the cylinder member and stopped randomly against the inner wall thereof.

DETAILED DESCRIPTION OF THE PREFERRED EMBODIMENT

Figure 1:
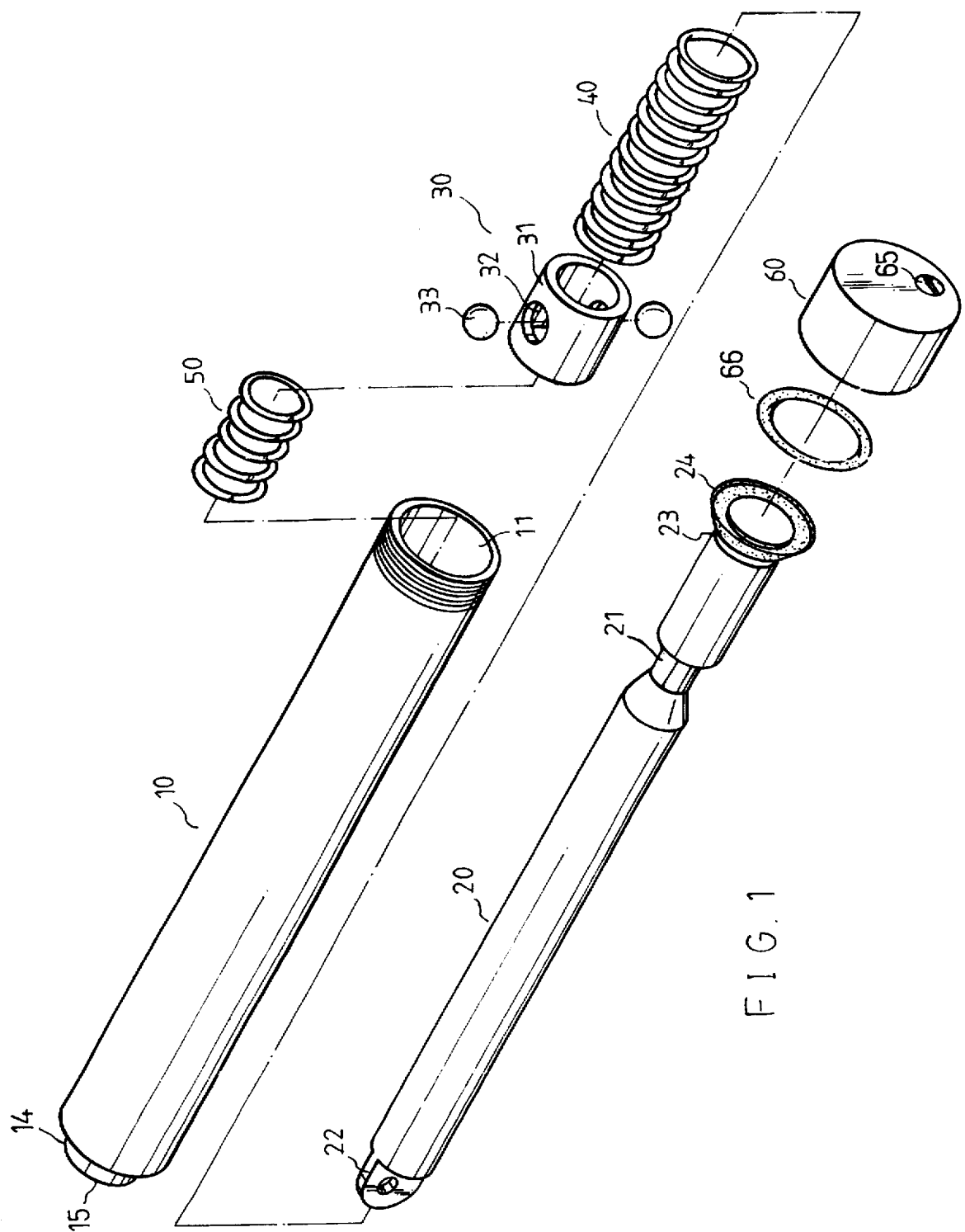
FIG. 1 is an exploded perspective view to show the preferred embodiment of the present invention.
Figure 2:
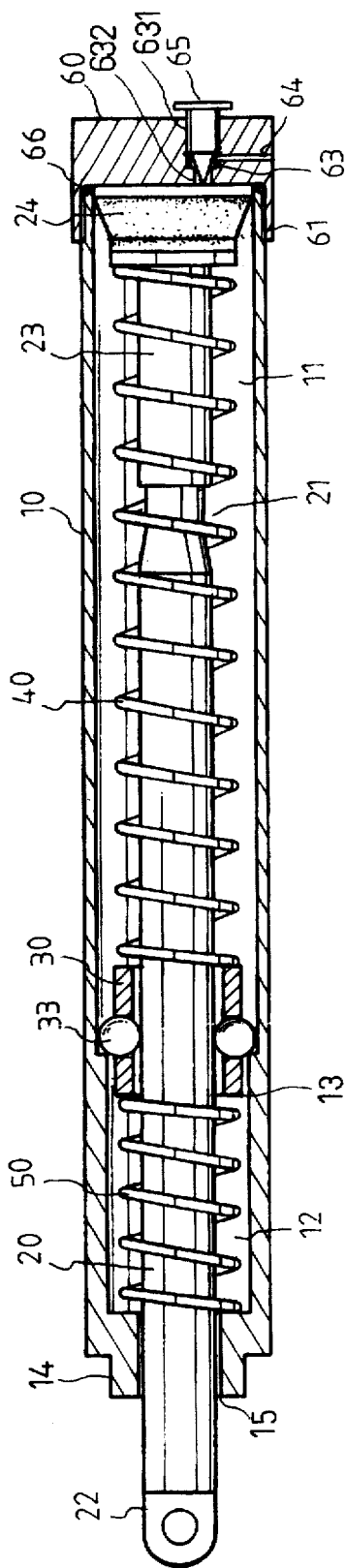
FIG. 2 is a sectional view to show an assembled self-rehabilitating device of the present invention.

With reference first to FIGS. 1 and 2 of the drawings, the self-rehabilitating device of the present invention generally comprises a tubular body 10, a cylinder member 20, a sleeve member 30, a first recoil spring 40 a second recoil spring 50 and an air valve 60.

The tubular body 10 has a large diameter first chamber 11 and a small diameter second chamber 12 in the hollow and defining a shoulder 13 therebetween, a neck 14 at a first end and an opening 15 at the other end having thread on the outer periphery thereof for engagement with the air valve 60.

The cylinder member 20 has an elongate body longer than that of the tubular body 10, an annular groove 21 including a tapered portion of camming surface, in the proximity of the inward end thereof and a retaining ring 22 at the other end thereof. The inward end thereof has a flange 23 which is provided to axially fasten a cock means 24. The cock means 24 is in trumpet shape and has a diameter equal to the inner diameter of the first chamber 11.

The sleeve member 30 has a ring body 31 of an inner diameter slightly larger than the outer diameter of the cylinder member 20 so as to slid about thereon, and a pair of radial apertures 32 formed through the opposing peripheries thereof for movably receiving a pair of steel balls 33 therein.

The air valve 60 is a cap which has thread 61 on inward periphery formed in registry with the thread on the outer periphery of the tubular body, a thickened bottom 62, an aperture 63 formed through the bottom 62 along the axis thereof, an air duct 64 perpendicular to the aperture 63 and terminated at a lateral periphery thereof and an air control thruster 65 engaged into the aperture 63. The aperture 63 has thread 631 on inner periphery and an introversive convergent portion to form an adjustment ring 632 adjacent the inward end thereof. The air control thruster 65, as shown in FIG. 1A, has a slotted head 651 at a first end, thread 652 on outer periphery made in registry with thread 631 and a taper 653 at the other end thereof. The air duct 64 is adjustable by fastening the air control thrustor 65 into the aperture 63 with the tapered end 653 inserted through the ring 632 and kept a clearance therebetween, so as to let the air passing through the ring 632 and the air duct 64. The size of the clearance can be adjustable by axial displacement of the air control thrustor 65 inward or outward in order to control the amount of the air fluid. It is understood that the speed of the rehabilitating movement of the cylinder member 20 relates to the sizable adjustment of the clearance.

When assembly, first fasten the cock means 24 onto the flanged end of the cylinder member 20 and sequentially wrap the first recoil spring 40, the sleeve member 30 and the second recoil spring 50 thereon as the cylinder member 20 inserts from the opening 15 into the tubular body 10 with the pair of steel balls 33 which are received in the radial apertures 32 of the sleeve member 30, finally fasten the air valve 60 onto the opening 15 of the tubular body 10 with a sealing ring 66 sealed thereinbetween. So that the free end of the cylinder member 20 extends to outside the tubular body 10 via the neck 14 thereof and the sleeve member 30 is biased by the pair of the first and second recoil springs 40 and 50 therebetween with the steel balls 33 stopped against the shoulder 13 of the tubular body 10 (as shown FIG. 2).

The free end of the cylinder member 20 is pivoted to a stationary object such as a lintel or frame and the opposite end of the tubular body 10 pivoted to a movable object such as a top rail of a door or its equivalent and/or vice versa.

Figure 3:
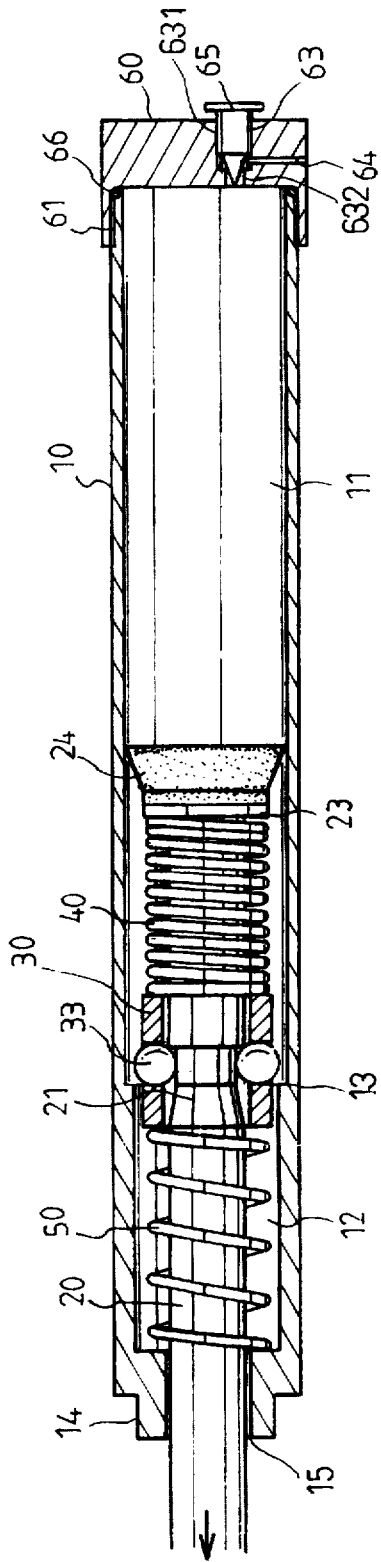
FIG. 3 is a sectional view to show a cylinder member of the self-rehabilitating device according to the present invention being extracted outward.

Referring to FIG. 3, when opens the door manually, the cylinder member 20 is extracting outward by the door as the first recoil spring 40 is contracted by the sleeve member 30 and the cock means 24 therebetween to reserve recoiling energy hereto and the cock means 24 draws sufficient air into the first chamber 11 via the air valve 60, while the sleeve member 30 is about to slide into the second chamber 12 because the pair of steel balls 33 in the apertures 32 are falling into the annular groove 22 of the cylinder member 20 but the sleeve member 30 is still resisted by the second spring 50. When releases the door, the cylinder member 20 is retracting back to its normal position by the recoiling force of the first recoil spring 40. The retracting movement of the cylinder member 20 is rather slow under the air pressure which is releasing slowly from the first chamber therein via the air valve 60. Therefore, the door or a movable object is closed gradually without a crash.

Referring to FIG. 4, which shows that a further extracting the cylinder member 20 outward from the tubular body 10 tends the steel balls 33 further sinking into the annular groove 21 thereof so as to allow the sleeve member 30 entering into the narrow space of the second chamber 12 via the shoulder 13. When the user releases his hand from the door or a movable object, a transient rehabilitating movement of the cylinder member 20, under both the recoiling springs 40 and 50, forces the two steel balls 33 moving outward from the apertures 32 because of that they are urged by the camming surface in the annular groove 21 and stop against the inner wall of the second chamber. Upon such arrangement, the sleeve member 30 can stop randomly inside the second chamber 12. It is otherwise that a door or a movable object can position randomly when the sleeve member 30 is entered into the second chamber 12. This time, if the user wishes to close the door or a movable object, he has to apply a slight pressure and pushes the door as to allow the sleeve member 30 extracting out of the second chamber 12 so that the door or a movable object will be automatically closed in the manner as recited above.

Based on aforediscussed structure, the position of the annular groove 21 on the cylinder member 20 is of a decisive factor to effect the speed of the self-rehabilitating movement of the present invention. It is understood that if the annular groove 21 is positioned in the proximity of the inward end of the cylinder member 20, the first recoil spring 40 will be biased within a small space between the sleeve member 30 and the cock means 24 when the cylinder member 20 is extracted outward and reserves greater energy for recoiling the cylinder member 20 to move backward in a faster manner. However, the speed can be slow down by the adjustment of the air control thrustor 65 of the air valve 60 so as to slowly release the air pressure accumulated inside the first chamber 11. Contrarily, if the annular groove 21 is positioned at a medial portion of the cylinder member 20, the first recoil spring 40 will be biased within a larger space between the sleeve member 30 and the cock means 24 and reserves a small energy hereto for recoiling the cylinder member 20 to move backward in a slow manner. To accommodate with such modification, the second chamber 12 becomes longer to provide greater space for randomly positioning a door or a movable object when it opens. This indicates that the structure of the present invention is variable to accomodate with the substantial circumstance.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A door closer with a pneumatic dashpot for automatically closing a movable object comprising:

a tubular body including a neck at a first end and an opening at a second end abutting a thread on an outer periphery thereof, a large diameter first chamber adjacent said opening and abutting a small diameter second chamber which is adjacent said neck so as to define a shoulder thereinbetween;

a cylinder member axially disposed inside said tubular body with a free end thereof extended to outside of said neck, said cylinder member having a length longer than that of said tubular body, an annular groove including a tapered portion thereon formed in the proximity of an inward end, a retaining ring at an outside end and a flange at the inward end thereof;

a cock means axially fastened to the inward end of said cylinder member inside said tubular body, said cock means having a diameter equal to the inner diameter of said first chamber of said tubular body so as to be slidable thereinabout;

a sleeve member slidably sleeved on said cylinder member stopped against the shoulder of said tubular body and having a pair of radial apertures formed respectively in opposite peripheral walls;

a pair of balls movably disposed into the radial apertures of said sleeve member and stopped against an inner peripheral wall of said tubular body therein;

a pair of first and second biasing means respectively disposed inside the first and second chambers of said tubular body each having on one end stopped against an opposite end of said sleeve member;

an air valve fastened into the opening of said tubular body and sealed by a sealing ring thereinbetween, said air valve being in cap form including thread inner periphery made in registry with the thread on the outer periphery of the opening, a thickened bottom through which a threaded aperture is formed along the axis thereof and an air duct perpendicular to said aperture and terminated at a lateral periphery thereof, said threaded aperture having an introversive convergent portion at an inward end to form an adjustment ring hereto;

an air control thrustor fastened into said threaded aperture and including a threaded outer periphery made in registry with the thread of said threaded aperture, a slotted head at a first end and a taper end at a second end thereof;

whereby said cylinder member is extrated outward from said tubular body to contract said first biasing means for reserving energy to recoil said cylinder member back to normal position and to reduce the air pressure into said first chamber via said valve for a slow rehabilitation of said cylinder member.

2. A door closer as recited in claim 1 wherein said taper portion of said air control thrustor is disengageably inserted into said adjustment ring in said air valve.

* * * * *